US012546146B2

(12) United States Patent
Qiu et al.

(10) Patent No.: US 12,546,146 B2
(45) Date of Patent: Feb. 10, 2026

(54) CONTROL METHOD FOR VEHICLE DOOR AND APPARATUS, VEHICLE AND COMPUTER STORAGE MEDIUM

(71) Applicant: BYD COMPANY LIMITED, Guangdong (CN)

(72) Inventors: Shoufa Qiu, Shenzhen (CN); Nan Lai, Shenzhen (CN); Xiuxia Wu, Shenzhen (CN); Qianqian Zhou, Shenzhen (CN); Fangcheng Li, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 122 days.

(21) Appl. No.: 18/648,509

(22) Filed: Apr. 29, 2024

(65) Prior Publication Data

US 2024/0271470 A1 Aug. 15, 2024

Related U.S. Application Data

(63) Continuation of application No. PCT/CN2022/141901, filed on Dec. 26, 2022.

(30) Foreign Application Priority Data

Dec. 30, 2021 (CN) ......................... 202111649687.8

(51) Int. Cl.
*G07C 9/22* (2020.01)
*E05B 81/76* (2014.01)
(Continued)

(52) U.S. Cl.
CPC .............. *E05B 81/78* (2013.01); *E05B 81/77* (2013.01); *E05B 85/103* (2013.01); *E05B 85/107* (2013.01)

(58) Field of Classification Search
CPC ........ E05B 81/78; E05B 81/77; E05B 85/103; E05B 85/107
See application file for complete search history.

(56) References Cited

U.S. PATENT DOCUMENTS 4,571,884 A * 2/1986 Hetmann ................ E05F 15/70 296/117
6,075,294 A * 6/2000 Van den Boom ....... E05B 81/78 340/541

(Continued)

FOREIGN PATENT DOCUMENTS

CN 101037907 A 9/2007
CN 103132784 A 6/2013

(Continued)

OTHER PUBLICATIONS

International Search Report from PCT/CN2022/141901 dated Dec. 26, 2022.

*Primary Examiner* — Quang Pham
(74) *Attorney, Agent, or Firm* — Calfee, Halter & Griswold LLP

(57) ABSTRACT

Provided are a control method for vehicle door and apparatus, a vehicle and a computer storage medium, and the control method for vehicle door includes: in response to a touch signal of a first touch area is collected, acquiring vehicle state information and key position information; in response to determine that the touch signal of the first touch area is valid and is a guard mode off request signal according to the vehicle state information and the key position information, controlling the vehicle to turn off a guard mode and driving door handles of the vehicle to stretch out; and after the door handles stretch out, in response to a touch signal of a second touch area corresponding to any door handle is collected, determining that the touch signal of the second touch area is valid according to the vehicle state information, (Continued)

and controlling a vehicle door corresponding to the door handle to unlock.

13 Claims, 4 Drawing Sheets

(51) Int. Cl.
*E05B 81/78* (2014.01)
*E05B 85/10* (2014.01)
*G07C 9/32* (2020.01)

(56) References Cited

U.S. PATENT DOCUMENTS 6,246,195 B1* 6/2001 Kloesters ................ E05F 15/70 318/266
6,412,584 B1* 7/2002 Faigle ..................... B60R 21/01 180/274
6,542,071 B1* 4/2003 Ohtsubo ............ G07C 9/00309 340/505
6,577,226 B1* 6/2003 Steiner ............... G07C 9/00309 340/5.72
6,998,967 B2* 2/2006 Brillon .................... B60R 25/24 340/539.23
7,062,945 B2* 6/2006 Saitoh ..................... E05B 81/78 49/502
7,392,619 B2* 7/2008 Pantke .................... E05F 15/70 49/31
7,402,917 B2* 7/2008 Gehin ..................... E05B 81/78 307/9.1
7,937,893 B2* 5/2011 Pribisic ................... E05F 15/70 340/5.72
8,091,280 B2* 1/2012 Hanzel ................ B60R 25/2054 49/506
8,346,467 B2* 1/2013 Vaysse ................... B60J 7/0573 701/301
8,360,505 B2* 1/2013 Iijima ..................... E05F 15/70 296/146.4
8,558,997 B2* 10/2013 Van Esch ............. G01B 11/272 356/28
9,957,737 B2* 5/2018 Patel ....................... E05B 85/10
10,308,223 B2* 6/2019 Tani ....................... B60R 25/245
10,336,296 B2* 7/2019 Hidaka ................... B60R 25/24
10,343,506 B2* 7/2019 Tamao ..................... B60J 10/86
10,633,895 B1* 4/2020 Salter ........................ F21V 9/32
11,014,532 B2* 5/2021 Weber ................. B60W 30/188
11,441,338 B2* 9/2022 Blank ..................... E05B 17/10
11,554,646 B2* 1/2023 Walawender ........... E05B 85/12
11,619,079 B2* 4/2023 Linden .................... E05B 81/77 292/336.3
11,624,228 B1* 4/2023 Austria ................... E05F 15/43 340/5.72
11,927,036 B2* 3/2024 Spick ................. H03K 17/9545
2001/0052839 A1* 12/2001 Nahata .................... E05B 81/78 340/5.72
2003/0001724 A1* 1/2003 Willats .................... E05B 81/76 340/5.72
2004/0039511 A1* 2/2004 Garnault ................ G07C 9/215 340/5.72
2004/0223336 A1* 11/2004 Murakami .............. E05B 81/76 362/501
2004/0251710 A1* 12/2004 Kachouh ................. E05B 81/14 296/146.1
2005/0219036 A1* 10/2005 Ueda ................... B60R 25/2036 340/5.72
2006/0055510 A1* 3/2006 Little ...................... E05B 81/78 340/5.72
2007/0018790 A1* 1/2007 LaFrance ........... G07C 9/00174 340/426.36
2007/0115096 A1* 5/2007 Suzuki ................ B60R 25/2036 340/5.72
2007/0132552 A1* 6/2007 Kurpinski ........... B60R 25/2036 340/5.72
2007/0205863 A1* 9/2007 Eberhard ........... G07C 9/00309 340/5.72
2008/0088139 A1* 4/2008 Sunahara ................ E05B 85/16 292/336.3
2008/0250607 A1* 10/2008 Ito ........................... E05B 81/78 16/412
2008/0296926 A1* 12/2008 Hanzel ................. H03K 17/941 704/251
2009/0001755 A1* 1/2009 Fuetterer ................ B60J 5/0409 296/146.16
2009/0119880 A1* 5/2009 Sibley ..................... E05B 81/76 16/412
2010/0011821 A1* 1/2010 Kim ........................ E05B 41/00 70/264
2010/0019510 A1* 1/2010 Ieda ........................ E05B 81/78 292/173
2010/0076651 A1* 3/2010 Nakakura ............... E05C 17/00 701/49
2010/0109192 A1* 5/2010 Castandet ............... E05B 81/77 264/272.14
2010/0136917 A1* 6/2010 Castandet .............. G01D 3/028 340/5.2
2011/0148575 A1* 6/2011 Sobecki .................. E05B 5/006 292/336.3
2012/0136532 A1* 5/2012 Konchan .................. B60J 10/77 296/146.3
2012/0167468 A1* 7/2012 Hozumi .................. E05D 15/58 49/209
2014/0240090 A1* 8/2014 Mutti ................. G07C 9/00309 340/5.61
2015/0204113 A1* 7/2015 Machida ................. E05B 79/10 292/336.3
2015/0274079 A1* 10/2015 Yang ......................... B60R 3/02 280/166
2015/0330133 A1* 11/2015 Konchan ................. E05B 81/76 296/146.4
2018/0218552 A1* 8/2018 Helligrath .......... G07C 9/00309
2019/0234121 A1* 8/2019 Pudney ................. E05B 85/103
2019/0242165 A1* 8/2019 Gebel ..................... E05C 19/04
2019/0329711 A1* 10/2019 Du ............................ B60R 3/02
2019/0390488 A1* 12/2019 Salter .................... E05B 85/103
2020/0087955 A1* 3/2020 Chen ..................... E05B 85/107
2020/0102773 A1* 4/2020 Sobecki ................ E05B 85/107
2020/0277810 A1* 9/2020 Salter .................... E05F 15/611
2021/0062558 A1* 3/2021 Beck ....................... E05B 81/90
2021/0276733 A1* 9/2021 Kozlenko ............... B64F 1/222
2021/0277690 A1* 9/2021 Vollmer ................ E05B 85/107
2021/0293061 A1* 9/2021 Blank ..................... E05B 81/77
2022/0018168 A1* 1/2022 Cervone ................. E05B 85/16
2022/0074245 A1* 3/2022 Konrad ................. E05F 15/611
2022/0154500 A1* 5/2022 Jeong ....................... E05B 77/42
2022/0213722 A1* 7/2022 Linden ..................... E05B 85/10
2024/0051498 A1* 2/2024 Cong ....................... E05B 81/56
2024/0132019 A1* 4/2024 McCollum ......... G07C 9/00309

FOREIGN PATENT DOCUMENTS

| | | | |
|---|---|---|---|
| CN | 103492652 | A | 1/2014 |
| CN | 108533100 | A | 9/2018 |
| CN | 108839635 | A | 11/2018 |
| CN | 208473507 | U | 2/2019 |
| CN | 109538037 | A | 3/2019 |
| CN | 209384825 | U | 9/2019 |
| CN | 110485837 | A | 11/2019 |
| CN | 209838008 | U | 12/2019 |
| CN | 110644871 | A | 1/2020 |
| CN | 209924678 | A | 1/2020 |
| CN | 209924678 | U | 1/2020 |
| CN | 212054206 | U | 12/2020 |
| CN | 111255314 | B | 6/2021 |
| CN | 113530381 | A | 10/2021 |
| CN | 216974484 | A | 7/2022 |
| KR | 10-2007-0120439 | A | 12/2007 |
| KR | 102173472 | B1 | 11/2020 |
| KR | 10-2021-0008635 | A | 1/2021 |

* cited by examiner

CONTROL METHOD FOR VEHICLE DOOR AND APPARATUS, VEHICLE AND COMPUTER STORAGE MEDIUM

CROSS-REFERENCE TO RELATED APPLICATIONS

The present disclosure is a bypass continuation of PCT International Application No. PCT/CN2022/141901, filed on Dec. 26, 2022, which claims priority to Chinese Patent Application No. 202111649687.8, entitled "CONTROL METHOD FOR VEHICLE DOOR AND APPARATUS, VEHICLE AND COMPUTER STORAGE MEDIUM" filed on Dec. 30, 2021, which are incorporated by reference in their entireties.

FIELD

The present disclosure relates to the technical field of vehicle control, and more specifically, to a control method for vehicle door and apparatus, a vehicle and a computer storage medium.

BACKGROUND

In the related arts, when a vehicle door handle is arranged as a hidden door handle, door opening is generally achieved by touching a sensing area to make the door handle stretch out, then manually unlocking a door lock by pulling the door handle, and then pulling the vehicle door open. This approach requires a user to pull the door handle, there is no improvement to the user experience compared to ordinary door handles, and the user experience is still unsatisfactory.

SUMMARY

The present disclosure proposes a control method for vehicle door.

The present disclosure further proposes a vehicle door control apparatus.

The present disclosure further proposes a vehicle.

The present disclosure further proposes a computer storage medium.

The control method for vehicle door according to the present disclosure includes the following steps: when a touch signal of a first touch area is collected, vehicle state information and key position information are acquired; when it is determined that the touch signal of the first touch area is valid and is a guard mode off request signal according to the vehicle state information and the key position information, a vehicle is controlled to turn off a guard mode and door handles of the vehicle are driven to stretch out; after the door handles stretch out, when a touch signal of a second touch area corresponding to any door handle is collected, the touch signal of the second touch area is determined to be valid according to the vehicle state information, and a vehicle door corresponding to the door handle is controlled to unlock.

In the control method for vehicle door according to this embodiment of the present disclosure, collection is first performed on the first touch area. When the touch signal is collected in the first touch area, the vehicle state information and the key position information are acquired. Then, it is determined whether the touch signal of the first touch area is valid according to the vehicle state information and the key position information. If it is valid, it is further determined which type of signal the touch signal belongs to. When it is determined that the touch signal is valid and is the guard mode off request signal, the vehicle is controlled to turn off the guard mode and the door handles are controlled to stretch out. After the door handles stretch out, signal acquisition is performed on the second touch area. When the touch signal is collected in the second touch area, the vehicle state information is acquired. When it is determined that the touch signal collected in the second touch area is valid according to the vehicle state information, the vehicle door corresponding to the door handle is controlled to unlock.

According to some embodiments of the present disclosure, after the vehicle state information and the key position information are acquired, the method further includes the following step: when it is determined that the touch signal of the first touch area is valid and is a guard mode on request signal according to the vehicle state information and the key position information, the vehicle is controlled to turn on the guard mode and the door handles of the vehicle are driven to get back.

According to some embodiments of the present disclosure, the determining that the touch signal of the first touch area is valid and is a guard mode off request signal according to the vehicle state information and the key position information includes the following step: when it is determined that the vehicle is in a guard mode on state and the vehicle is in an OFF gear state according to the vehicle state information and it is determined that a key is outside the vehicle according to the key position information, it is determined that the touch signal of the first touch area is valid and is the guard mode off request signal.

According to some embodiments of the present disclosure, the determining that the touch signal of the first touch area is valid and is a guard mode on request signal according to the vehicle state information and the key position information includes the following step: when it is determined that the vehicle is in a guard mode off state, the vehicle doors are in a locked state and the vehicle is in an OFF gear state according to the vehicle state information and it is determined that a key is outside the vehicle according to the key position information, it is determined that the touch signal of the first touch area is valid and is the guard mode on request signal.

According to some embodiments of the present disclosure, after the vehicle state information and the key position information are acquired, the method further includes the following step: when it is determined that the vehicle is in a guard mode off state and the vehicle doors are in an unlocked state according to the vehicle state information, it is determined that the touch signal of the first touch area is invalid; or when it is determined that the vehicle is in the guard mode off state, the vehicle doors are in a locked state and the vehicle is not in an OFF gear state according to the vehicle state information, it is determined that the touch signal of the first touch area is invalid; or when it is determined that the vehicle is in a guard mode off state, the vehicle doors are in a locked state and the vehicle is in an OFF gear state according to the vehicle state information and it is determined that the key is not outside the vehicle according to the key position information, it is determined that the touch signal of the first touch area is invalid; or when it is determined that the vehicle is in a guard mode on state and the vehicle is not in an OFF gear state according to the vehicle state information, it is determined that the touch signal of the first touch area is invalid; or when it is determined that the vehicle is in a guard mode on state and the vehicle is in an OFF gear state according to the vehicle state information and it is determined that the key is not outside the vehicle according to the key position information, it is determined that the touch signal of the first touch area is invalid.

According to some embodiments of the present disclosure, after the vehicle is controlled to turn off the guard mode or turn on the guard mode and before the door handles of the vehicle are driven to stretch out or get back, the method further includes the following step: it is determined that door handle motors of the vehicle are not in a thermal protection state.

According to some embodiments of the present disclosure, the determining that the touch signal of the second touch area is valid according to the vehicle state information includes the following step: when it is determined that the vehicle door corresponding to the door handle is in a locked state and a guard mode off state according to the vehicle state information, it is determined that the touch signal of the second touch area is valid.

The vehicle according to the present disclosure includes a memory, a processor, and a vehicle door control program stored in the memory and runnable on the processor. The vehicle door control program when executed by the processor implements a control method for vehicle door according to the above embodiment.

The computer-readable storage medium according to the present disclosure stores a vehicle door control program. The vehicle door control program when executed by a processor implements a control method for vehicle door according to the above embodiment.

The additional aspects and advantages of the present disclosure will be provided in the following description, some of which will become apparent from the following description or may be learned from practices of the present disclosure.

BRIEF DESCRIPTION OF THE DRAWINGS

The foregoing and/or additional aspects and advantages of the present disclosure will become apparent and comprehensible from the following descriptions of the embodiments with reference to the accompanying drawings.

DETAILED DESCRIPTION

The embodiments of the present disclosure are described below in detail. Examples of the embodiments are shown in the accompanying drawings, and same or similar reference signs in all the accompanying drawings indicate same or similar components or components having same or similar functions. The embodiments described below with reference to the accompanying drawings are exemplary, and are intended to explain the present disclosure and cannot be construed as limitations on the present disclosure.

A control method for vehicle door and apparatus, a vehicle and a computer storage medium according to the embodiments of the present disclosure will be described below with reference to the accompanying drawings.

Figure 1:
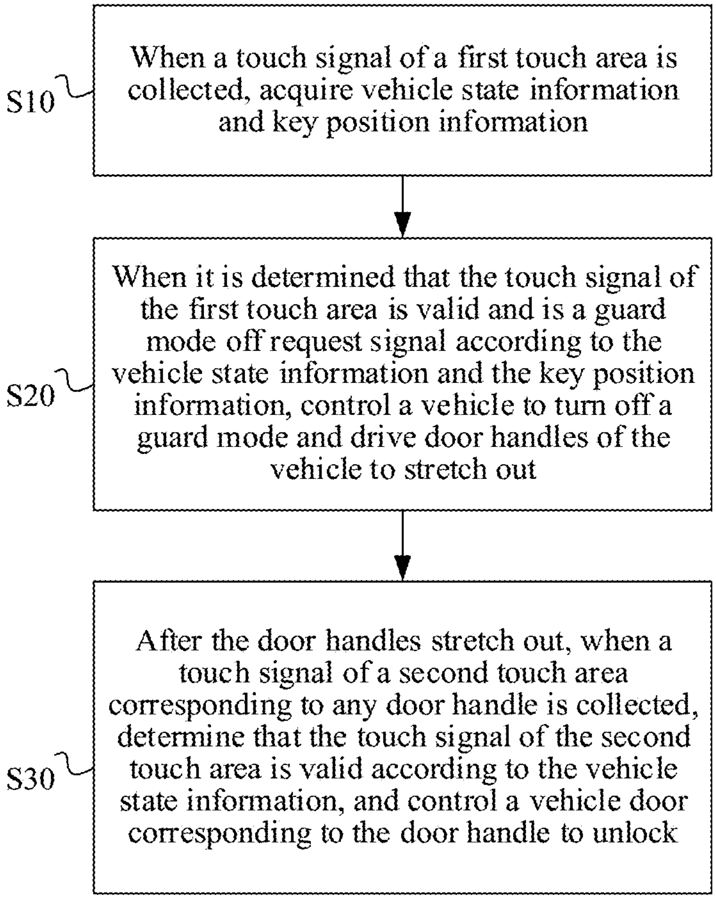
FIG. 1 is a flowchart of a control method for vehicle door according to an embodiment of the present disclosure.

FIG. 1 is a flowchart of a control method for vehicle door according to an embodiment of the present disclosure.

As shown in FIG. 1, the present disclosure proposes a control method for vehicle door. The control method for vehicle door includes the following steps:

In S10, when a touch signal of a first touch area is collected, vehicle state information and key position information are acquired.

Figure 2:
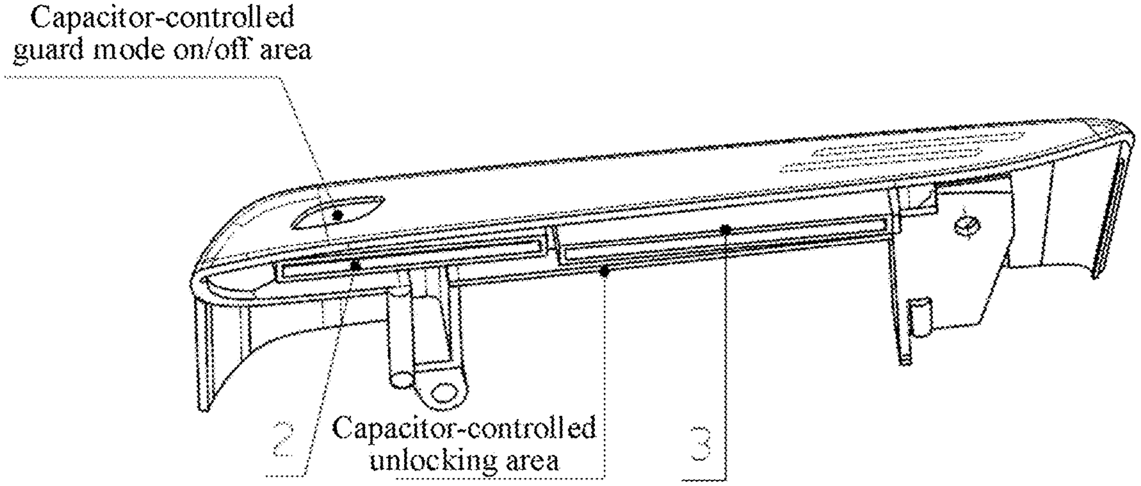
FIG. 2 is a schematic diagram of a vehicle door handle according to a specific embodiment of the present disclosure.

In this embodiment of the present disclosure, dual capacitors may be arranged to unlock each vehicle door. As shown in FIG. 2, a first capacitor 2 may be used for guard mode off and guard mode on control of the vehicle door, and a second capacitor 3 may be used for unlocking control of the vehicle door.

Referring to FIG. 2, the first touch area may be a capacitor-controlled guard mode on/off area in FIG. 2. When a user touches this area, a domain controller of the vehicle can collect a corresponding touch signal. After the domain controller collects the touch signal of the first touch area, the vehicle state information and the key position information of the vehicle are acquired. It is to be understood that, the vehicle state information in this embodiment includes a guard mode state of the vehicle, a locked state of vehicle doors, a gear state of the vehicle, and key position information.

It is to be understood that, the first capacitor 2 and the second capacitor 3 may be fixedly arranged in a door handle cavity through buckles, the door handle cavity is then filled with adhesive by adopting an adhesive filling technology to achieve the fixation and waterproof sealing performance of the first capacitor 2 and the second capacitor 3. Generally, the first touch area is arranged on a rear side of the door handle.

In S20, when it is determined that the touch signal of the first touch area is valid and is a guard mode off request signal according to the vehicle state information and the key position information, the vehicle is controlled to turn off a guard mode and door handles of the vehicle are driven to stretch out.

In some embodiments, after the vehicle state information and the key position information are acquired, it can be determined whether the touch signal of the first touch area is valid according to the information. If it is valid, it can be further determined whether the touch signal of the first touch area is the guard mode off request signal.

In some embodiments, the determining that the touch signal of the first touch area is valid and is a guard mode off request signal according to the vehicle state information and the key position information includes the following step: when it is determined that the vehicle is in a guard mode on state and the vehicle is in an OFF gear state according to the vehicle state information and it is determined that a key is outside the vehicle according to the key position information, it is determined that the touch signal of the first touch area is valid and is the guard mode off request signal.

In some embodiments, after the touch signal of the first touch area is collected, the domain controller acquires the vehicle state information and the key position information through CAN bus signals and other means. When it is determined that the vehicle is in a guard mode on state, the vehicle is in an OFF gear state and the key is outside the vehicle, the touch signal of the first touch area is valid and is the guard mode off request signal.

It is to be understood that, when it is determined that the vehicle is not in a guard mode on state, there is no need to turn off the guard mode, so the current touch signal of the first touch area is not the guard mode off request signal; when it is determined that the vehicle is not in an OFF gear state, which indicates that the current user possibly does not plan to park, there is no need to turn off the guard mode, so the touch signal is not the guard mode off request signal; and when it is determined that the key of the vehicle is inside the vehicle, for example, the key of the vehicle is inserted into a keyhole, which may also indicate that the current user does not plan to park, there is need to turn off the guard mode, and the touch signal is not the guard mode off request signal.

After it is determined that the touch signal of the first touch area is valid and is the guard mode off request signal, the vehicle can be controlled to perform a guard mode off operation and the door handles of the vehicle can be driven to stretch out.

It is to be understood that, the guard mode off operation of the vehicle in this embodiment aims at turning off the guard mode of the vehicle door, that is, before the vehicle door is opened, the guard mode off operation needs to be performed. If not, the vehicle door cannot be opened normally. After the guard mode off operation is completed, the door handle of the vehicle can be controlled by a door handle motor to stretch out to expose the touch area corresponding to the second capacitor, i.e., a capacitor-controlled unlocking area illustrated in FIG. 2.

In S30, after the door handles stretch out, when a touch signal of a second touch area corresponding to any door handle is collected, the touch signal of the second touch area is determined to be valid according to the vehicle state information, and the vehicle door corresponding to the door handle is controlled to unlock.

In some embodiments, after the door handles of the vehicle stretch out, the second touch area can be exposed, and the user can touch the second touch area of any door handle. After the domain controller collects the touch signal of the second touch area, the vehicle state information can be further acquired, and then it is determined whether the touch signal of the second touch area is valid according to the vehicle state information.

In some embodiments, when it is determined that the vehicle door corresponding to the door handle is in a locked state and a guard mode off state according to the vehicle state information, it is determined that the touch signal of the second touch area is valid.

In some embodiments, after the vehicle state information is acquired, it can be determined whether the vehicle doors of the vehicle are in a locked state and whether the vehicle is in a guard mode off state according to the vehicle state information. When the vehicle doors of the vehicle are in a locked state and the vehicle is in a guard mode off state, it indicates that the guard mode off operation of the vehicle has been completed after the user touches the first touch area. When it is detected that the doors of the current vehicle are not in a locked state, there is no need to unlock them again, so the touch signal of the second touch area is invalid.

When it is determined that the touch signal of the second touch area is valid, an electric unlocking motor may be driven to control the corresponding vehicle door to unlock. Specifically, the electric unlocking motor may be controlled to drive for 300 ms to unlock the corresponding vehicle door, so that the user no longer needs to pull the door handle to a certain distance to unlock the vehicle door, thus improving the user experience.

In some embodiments of the present disclosure, after the vehicle state information and the key position information are acquired, the method further includes the following step: when it is determined that the touch signal of the first touch area is valid and is the guard mode on request signal according to the vehicle state information and the key position information, the vehicle is controlled to turn on the guard mode and the door handles of the vehicle are driven to get back.

In some embodiments, after the vehicle state information and the key position information are acquired, when it is determined that the vehicle is in a guard mode off state, the vehicle doors are in a locked state, the vehicle is in an OFF gear state and the key is outside the vehicle according to the vehicle state information and the key position information, it is determined that the touch signal of the first touch area is valid and the touch signal is the guard mode on request signal.

It is to be understood that, the guard mode on request signal may correspond to an operation of closing the vehicle door, while the guard mode off request signal may correspond to an operation of opening the vehicle door.

In some embodiments of the present disclosure, after the vehicle state information and the key position information are acquired, the method further includes the following step: when it is determined that the vehicle is in a guard mode off state and the vehicle doors are in an unlocked state according to the vehicle state information, it is determined that the touch signal of the first touch area is invalid; or when it is determined that the vehicle is in a guard mode off state, the vehicle doors are in a locked state and the vehicle is not in an OFF gear state according to the vehicle state information, it is determined that the touch signal of the first touch area is invalid; or when it is determined that the vehicle is in a guard mode off state, the vehicle doors are in a locked state and the vehicle is in an OFF gear state according to the vehicle state information and it is determined that the key is not outside the vehicle according to the key position information, it is determined that the touch signal of the first touch area is invalid; or when it is determined that the vehicle is in a guard mode on state and the vehicle is not in an OFF gear state according to the vehicle state information, it is determined that the touch signal of the first touch area is invalid; or when it is determined that the vehicle is in a guard mode on state and the vehicle is in an OFF gear state according to the vehicle state information and it is determined that the key is not outside the vehicle according to the key position information, it is determined that the touch signal of the first touch area is invalid.

In some embodiments, it is to be understood that, when whether the touch signal of the first touch area is valid is determined according to the vehicle state information and the key position information, a reference may be made to the above embodiment for determining the guard mode off signal and the guard mode on signal; when the touch signal does not satisfy the guard mode off signal and the guard mode on signal, it can be determined that the touch signal is an invalid signal.

In some embodiments of the present disclosure, after the vehicle is controlled to turn off the guard mode or turn on the guard mode and before the door handles of the vehicle are driven to stretch out or get back, the method further includes the following step: it is determined that door handle motors of the vehicle are not in a thermal protection state.

In some embodiments, in order to prevent children or some users from frequently opening and closing the doors, which may cause the motors to burn out, door handle motor thermal protection may be set up. The door handle motors are used for driving the door handles to stretch out and get back. When the door handle motors are in a thermal protection state, the vehicle can be controlled to turn off the guard mode or turn on the guard mode, but the door handles will not stretch out or get back. Specifically, it can be determined whether the motor is in a thermal protection state by the temperature of the motor or operating frequency of the motor. For example, if the motor repetitively runs more than 15 times within five minutes, it can be determined that the motor is in a thermal protection state. After it is determined that the motor is in the thermal protection state, the touch signal of the first touch area may be collected again after 30 s.

Figure 3:
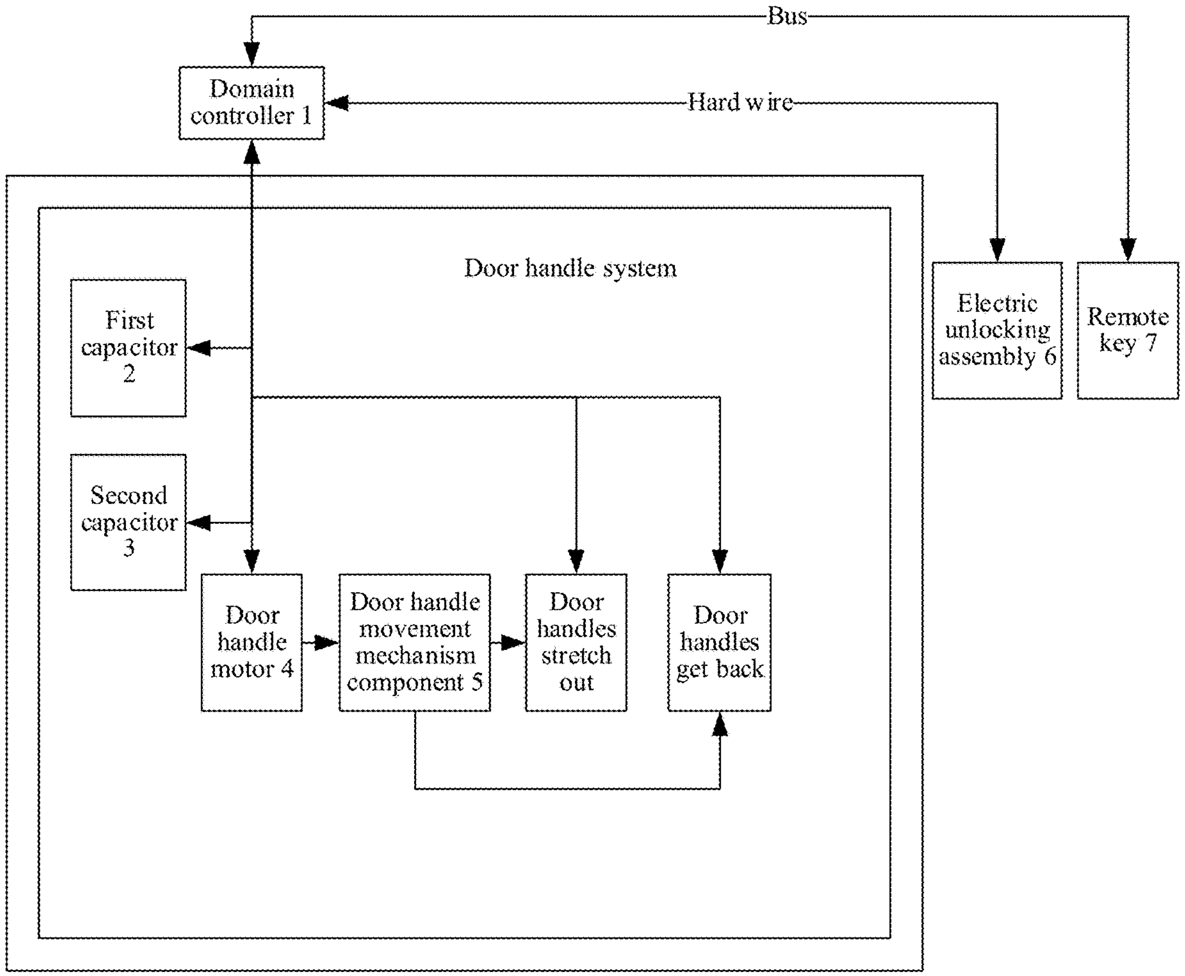
FIG. 3 is a schematic diagram of a vehicle door handle system according to a specific embodiment of the present disclosure.

Referring to FIG. 3, a door handle system may include a first capacitor 2, a second capacitor 3, a door handle motor 4, a door handle movement mechanism component 5, etc. After a domain controller 1 receives a touch signal from the first capacitor, when the signal is valid, it may control the door handle motor 4 to drive the door handle movement mechanism component 5 to control the door handle to stretch out or get back, and then it may receive a touch signal from the second capacitor 3 to unlock the vehicle door. It is to be understood that, the unlocking of the vehicle door may be controlled by an electric unlocking assembly 6, and a remote key 7 illustrated in the figure can provide the key position information to the domain controller 1.

Figure 4:
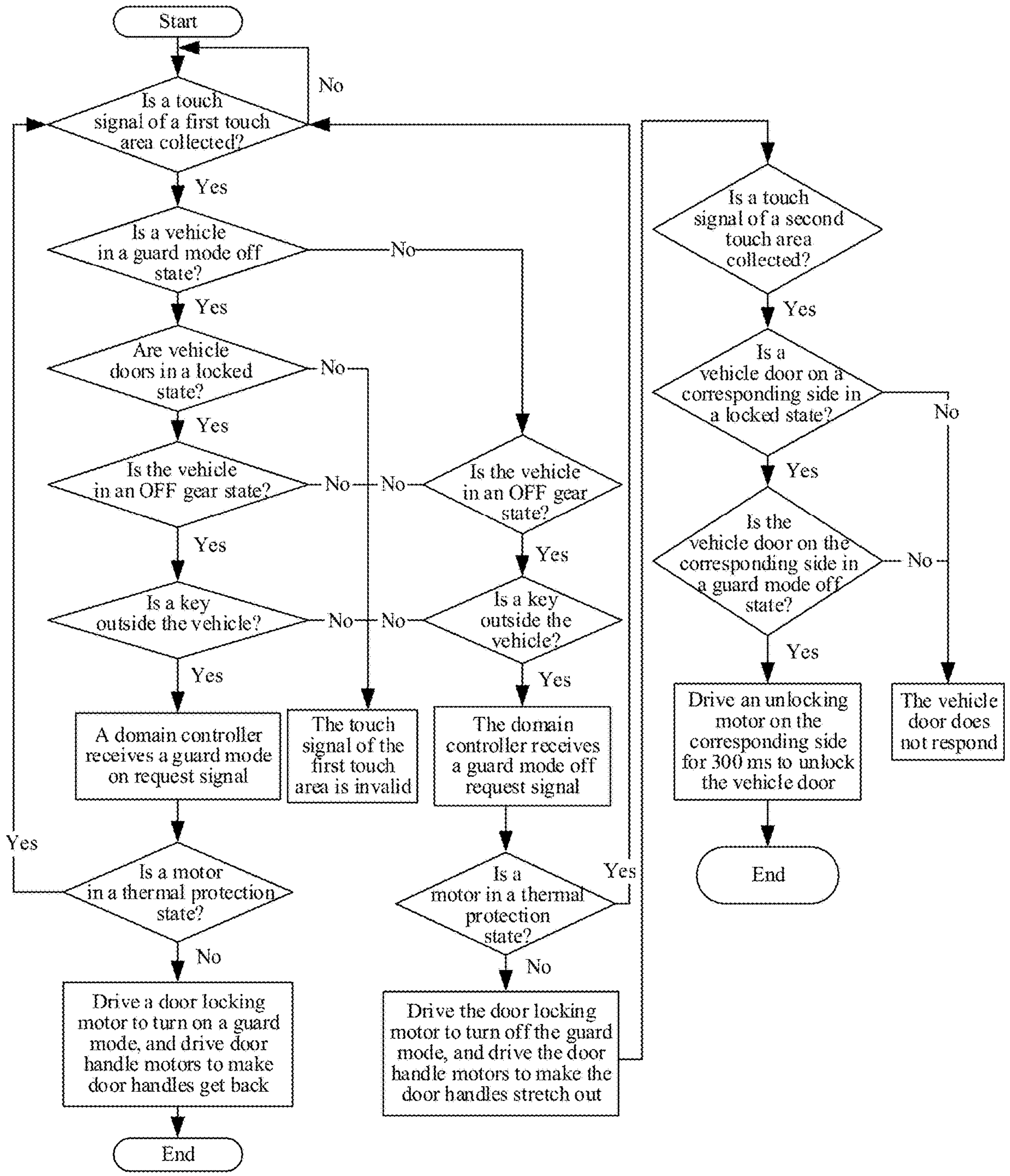
FIG. 4 is a flowchart of a control method for vehicle door according to a specific embodiment of the present disclosure.

To sum up, in a specific embodiment, referring to FIG. 2 and FIG. 4, firstly, the touch signal of the first touch area is collected through the first capacitor 2. When the touch signal is collected, it is determined whether the vehicle is in a guard mode off state. When the vehicle is in a guard mode off state, it is determined whether the vehicle doors are in a locked state. When the vehicle doors are in a locked state, it is further determined whether the vehicle is in an OFF gear state. If the vehicle is in an OFF gear state, it can be determined whether the key is outside the vehicle. When the key is outside the vehicle, it is determined that the domain controller 1 receives the guard mode on request signal, and then it is determined whether the door handle motor is in a thermal protection state. If not, a door locking motor is driven to turn on the guard mode and the door handle motor is driven to make the door handle get back. When it is determined that the vehicle is not in a guard mode off state, the vehicle is in the OFF gear and the key is outside the vehicle, it is determined that the domain controller 1 receives the guard mode off request signal, and then it is determined whether the door handle motor is in a thermal protection state. When the door handle motor is not in a thermal protection state, the door locking motor is driven to turn off the guard mode and the door handle motor is driven to stretch out. When the touch signal of the second touch area is collected through the second capacitor 3, it is determined whether the vehicle door on a corresponding side is in a locked state. When the vehicle door on the corresponding side is in a locked state, it is further determined whether the vehicle door on the corresponding side is in a guard mode off state. When the vehicle door on the corresponding side is in a guard mode off state, an unlocking motor on the corresponding side is driven for 300 ms to unlock the vehicle door. When the touch signal of the second touch area is collected, the vehicle door on the corresponding side is not in a locked state and the vehicle door on the corresponding side is not in a guard mode off state, the vehicle door will not respond. Before the unlocking motor on the corresponding side is driven for 300 ms to unlock the vehicle door, the method may further include determining whether the unlocking motor is in a thermal protection state. When the unlocking motor is not in a thermal protection state, the unlocking motor on the corresponding side is driven for 300 ms to unlock the vehicle door. When the unlocking motor is in a thermal protection state, the vehicle door will not be unlocked.

To sum up, the control method for vehicle door according to this embodiment of the present disclosure can allow users to unlock the vehicle doors without additionally pulling the door handles, thus greatly improving the user experience.

Figure 5:
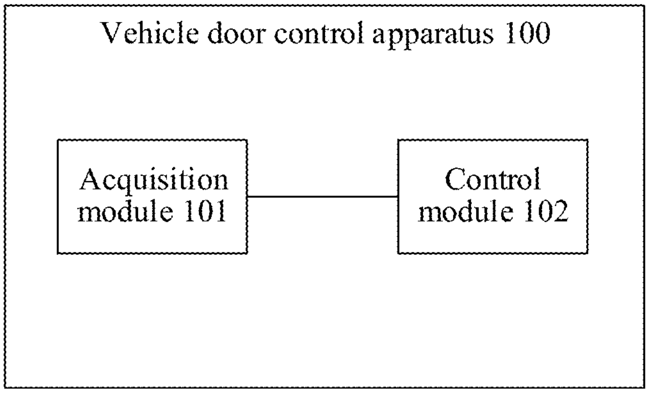
FIG. 5 is a structural block diagram of a vehicle door control apparatus according to an embodiment of the present disclosure.

FIG. 5 is a structural block diagram of a vehicle door control apparatus according to an embodiment of the present disclosure.

As shown in FIG. 5, the present disclosure proposes a vehicle door control apparatus 100. The vehicle door control apparatus 100 includes an acquisition module 101 and a control module 102.

The acquisition module 101 is configured to, when a touch signal of a first touch area is collected, acquire vehicle state information and key position information. The control module 102 is configured to, when it is determined that the touch signal of the first touch area is valid and is a guard mode off request signal according to the vehicle state information and the key position information, control a vehicle to turn off a guard mode and drive door handles of the vehicle to stretch out; and after the door handles stretch out, when a touch signal of a second touch area corresponding to any door handle is collected, determine that the touch signal of the second touch area is valid according to the vehicle state information, and control a vehicle door corresponding to the door handle to unlock.

In some embodiments of the present disclosure, the control module 102 is further configured to, after the vehicle state information and the key position information are acquired, when it is determined that the touch signal of the first touch area is valid and is the guard mode on request signal according to the vehicle state information and the key position information, control the vehicle to turn on the guard mode and the door handles of the vehicle are driven to get back.

In some embodiments of the present disclosure, the control module 102 is further configured to, when it is determined that the vehicle is in a guard mode on state and the vehicle is in an OFF gear state according to the vehicle state information and it is determined that a key is outside the vehicle according to the key position information, determine that the touch signal of the first touch area is valid and is the guard mode off request signal.

In some embodiments of the present disclosure, the control module 102 is further configured to, when it is determined that the vehicle is in a guard mode off state, vehicle doors are in a locked state and the vehicle is in an OFF gear state according to the vehicle state information and it is determined that the key is outside the vehicle according to the key position information, it is determined that the touch signal of the first touch area is valid and is the guard mode on request signal.

In some embodiments of the present disclosure, the control module 102 is further configured to, after the vehicle state information and the key position information are acquired, when it is determined that the vehicle is in a guard mode off state and the vehicle doors are in an unlocked state according to the vehicle state information, determine that the touch signal of the first touch area is invalid; or when it is determined that the vehicle is in a guard mode off state, the vehicle doors are in a locked state and the vehicle is not in an OFF gear state according to the vehicle state information, determine that the touch signal of the first touch area is invalid; or when it is determined that the vehicle is in a guard mode off state, the vehicle doors are in a locked state and the vehicle is in an OFF gear state according to the vehicle state information and it is determined that the key is not outside the vehicle according to the key position information, determine that the touch signal of the first touch area is invalid; or when it is determined that the vehicle is in a guard mode on state and the vehicle is not in an OFF gear state according to the vehicle state information, determine that the touch signal of the first touch area is invalid; or when it is determined that the vehicle is in a guard mode on state and the vehicle is in an OFF gear state according to the vehicle state information and it is determined that the key is not outside the vehicle according to the key position information, determine that the touch signal of the first touch area is invalid.

In some embodiments of the present disclosure, the control module 102 is further configured to, before the vehicle is controlled to turn off the guard mode or turn on the guard mode, determine that door handle motors of the vehicle are not in a thermal protection state.

In some embodiments of the present disclosure, the determining that the touch signal of the second touch area is valid according to the vehicle state information includes the following step: when it is determined that the vehicle door corresponding to the door handle is in a locked state and a guard mode off state according to the vehicle state information, it is determined that the touch signal of the second touch area is valid.

It is to be understood that, for the specific implementation of the vehicle door control apparatus according to this embodiment of the present disclosure, a reference can be made to the specific implementation of the control method for vehicle door in the above embodiment, which will not be repeated here.

To sum up, the vehicle door control apparatus according to this embodiment of the present disclosure can allow users to unlock the vehicle doors without additionally pulling the door handles, thus greatly improving the user experience.

Figure 6:
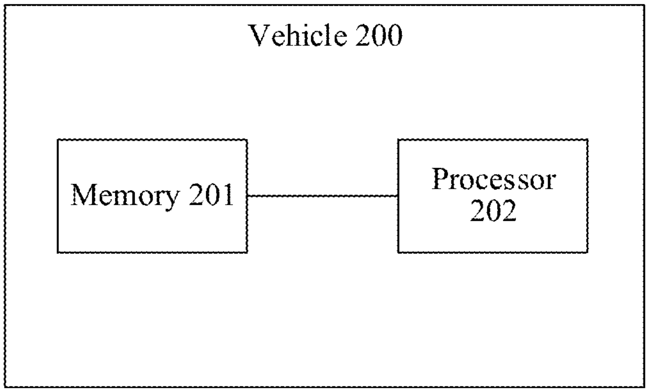
FIG. 6 is a structural block diagram of a vehicle according to an embodiment of the present disclosure.

FIG. 6 is a structural block diagram of a vehicle according to an embodiment of the present disclosure.

As shown in FIG. 6, the present disclosure proposes a vehicle 200. The vehicle 200 includes a memory 201, a processor 202, and a vehicle door control program stored in the memory 201 and runnable on the processor 202. The vehicle door control program when executed by the processor implements a control method for vehicle door according to the above embodiment.

The vehicle according to this embodiment of the present disclosure includes the memory and the processor, and the processor executes the vehicle door control program stored in the memory, which can allow users to unlock the vehicle doors without additionally pulling the door handles, thus greatly improving the user experience.

The present disclosure proposes a computer-readable storage medium. The computer-readable storage medium stores a vehicle door control program. The vehicle door control program when executed by a processor implements a control method for vehicle door according to the above embodiment.

The computer-readable storage medium according to this embodiment of the present disclosure, by executing the vehicle door control program stored therein through the processor, can allow users to unlock the vehicle doors without additionally pulling door handles, thus greatly improving the user experience.

It is to be understood that, the logic and/or steps shown in the flowcharts or described in any other manner herein, for example, a sequenced list that may be considered as executable instructions used for implementing logical functions, may be specifically implemented in any computer-readable medium to be used by an instruction execution system, apparatus, or device (for example, a computer-based system, a system including a processor, or another system that can obtain an instruction from the instruction execution system, apparatus, or device and execute the instruction) or to be used by combining such instruction execution systems, apparatuses, or devices. In this specification, the "computer-readable medium" may be any apparatus that can include, store, communicate, propagate, or transmit programs to be used by the instruction execution system, apparatus or device or to be used by combining such instruction execution systems, apparatuses or devices. More specific examples (a non-exhaustive list) of the computer-readable medium include the following: an electrical connection (electronic apparatus) having one or more wires, a portable computer diskette (magnetic apparatus), a random access memory (RAM), a read-only memory (ROM), an erasable programmable read-only memory (EPROM or flash memory), an optical fiber apparatus, and a portable compact disk read-only memory (CDROM). In addition, the computer-readable medium can even be paper or other suitable media on which the program can be printed, because the program can be obtained electronically by, for example, optically scanning paper or other media, then editing, interpreting, or processing in other suitable ways if necessary, and then storing it in a computer memory.

It is to be understood that, parts of the present disclosure can be implemented by using hardware, software, firmware, or a combination thereof. In the foregoing implementations, multiple steps or methods may be implemented by using software or firmware that are stored in a memory and are executed by a proper instruction execution system. For example, if hardware is used for implementation, same as in another implementation, implementation may be performed by any one of the following technologies well known in the art or a combination thereof: a discrete logic circuit including a logic gate circuit for implementing a logic function of a data signal, a dedicated integrated circuit including a proper combined logic gate circuit, a programmable gate array (PGA), a field programmable gate array (FPGA), and the like.

In the description of this specification, the description of the reference terms "an embodiment", "some embodiments", "an example", "a specific example", "some examples," and the like means that specific features, structures, materials or characteristics described in combination with the embodiment(s) or example(s) are included in at least one embodiment or example of the present disclosure. In this description, exemplary descriptions of the above terms do not necessarily refer to the same embodiment or example. In addition, the described specific features, structures, materials, or characteristics may be combined in a proper manner in any one or more of the embodiments or examples.

In the description of the present disclosure, it is to be understood that, orientation or position relationships indicated by the terms such as "center", "longitudinal", "transverse", "length", "width", "thickness", "up", "down", "front", "back", "left", "right", "vertical", "horizontal", "top", "bottom", "inside", "outside", "clockwise", "anti-clockwise", "axial", "radial", and "circumferential" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limitations to the present disclosure.

In addition, terms such as "first" and "second" used in the embodiments of the present disclosure are only used for the purpose of description and cannot be understood as indicating or implying relative importance or implying a quantity of the indicated technical features in the embodiments. Therefore, a feature restricted by the term such as "first" or "second" in any embodiment of the present disclosure may explicitly or implicitly indicate that this embodiment includes at least one of such features. In the descriptions of the present disclosure, unless explicitly specified in the embodiments, "multiple" means at least two or more than two, for example, two, three or four In the present disclosure, unless otherwise explicitly specified or limited in the embodiments, the terms "mount", "connect", "connection", and "fix" should be understood in a broad sense. For example, a connection may be a fixed connection, a detachable connection, or an integral connection. It is to be understood that, it may also be a mechanical connection, an electric connection, etc. Of course, it may also be a direct connection, an indirect connection through an intermediate medium, internal communication between two components, or an interaction relationship between two components. A person of ordinary skill in the art can understand specific meanings of the terms in the present disclosure based on specific situations.

In the present disclosure, unless otherwise explicitly specified and limited, the first feature being located "above" or "below" the second feature may be the first feature being in a direct contact with the second feature, or the first feature being in an indirect contact with the second feature through an intermediate medium. In addition, the first feature being "above", "over", or "on" the second feature may indicate that the first feature is directly above or obliquely above the second feature, or may merely indicate that the horizontal position of the first feature is higher than that of the second feature. That the first feature is "below", "under", and "beneath" the second feature may be that the first feature is right below the second feature or at an inclined bottom of the second feature, or may merely indicate that the horizontal position of the first feature is lower than that of the second feature.

Although the embodiments of the present disclosure have been shown and described above, it can be understood that, the foregoing embodiments are exemplary and should not be understood as limitation to the present disclosure. A person of ordinary skill in the art can make changes, modifications, replacements, or variations to the foregoing embodiments within the scope of the present disclosure.

What is claimed is:

1. A method for controlling a vehicle door, comprising:

in response to a touch signal of a first touch area being collected, acquiring vehicle state information and key position information;

in response to determine that the touch signal of the first touch area is valid and is a guard mode off request signal according to the vehicle state information and the key position information, controlling a vehicle to turn off a guard mode and driving door handles of the vehicle to stretch out; and after the door handles stretch out, in response to a touch signal of a second touch area corresponding to any door handle being collected, determining that the touch signal of the second touch area is valid according to the vehicle state information, and controlling a vehicle door corresponding to the door handle to unlock.

2. The method for controlling a vehicle door according to claim 1, after acquiring the vehicle state information and the key position information, the method further comprising:

in response to determine that the touch signal of the first touch area is valid and is a guard mode on request signal according to the vehicle state information and the key position information, controlling the vehicle to turn on the guard mode and driving the door handles of the vehicle to get back.

3. The method for controlling a vehicle door according to claim 1, wherein the determining that the touch signal of the first touch area is valid and is a guard mode off request signal according to the vehicle state information and the key position information comprises:

in response to determine that the vehicle is in a guard mode on state and the vehicle is in an OFF gear state according to the vehicle state information and determining that a key is outside the vehicle according to the key position information, determining that the touch signal of the first touch area is valid and is the guard mode off request signal.

4. The method for controlling a vehicle door according to claim 2, wherein the determining that the touch signal of the first touch area is valid and is a guard mode on request signal according to the vehicle state information and the key position information comprises:

in response to determine that the vehicle is in a guard mode off state, the vehicle doors are in a locked state and the vehicle is in an OFF gear state according to the vehicle state information and determining that a key is outside the vehicle according to the key position information, determining that the touch signal of the first touch area is valid and is the guard mode on request signal.

5. The method for controlling a vehicle door according to claim 1, after acquiring the vehicle state information and the key position information, the method further comprising:

in response to determine that the vehicle is in a guard mode off state and the vehicle doors are in an unlocked state according to the vehicle state information, determining that the touch signal of the first touch area is invalid; or in response to determine that the vehicle is in a guard mode off state, the vehicle doors are in a locked state and the vehicle is not in an OFF gear state according to the vehicle state information, determining that the touch signal of the first touch area is invalid; or in response to determine that the vehicle is in a guard mode off state, the vehicle doors are in a locked state and the vehicle is in an OFF gear state according to the vehicle state information and determining that a key is not outside the vehicle according to the key position information, determining that the touch signal of the first touch area is invalid; or in response to determine that the vehicle is in a guard mode on state and the vehicle is not in an OFF gear state according to the vehicle state information, determining that the touch signal of the first touch area is invalid; or in response to determine that the vehicle is in a guard mode on state and the vehicle is in an OFF gear state according to the vehicle state information and determining that the key is not outside the vehicle according to the key position information, determining that the touch signal of the first touch area is invalid.

6. The method for controlling a vehicle door according to claim 2, after controlling the vehicle to turn off the guard mode or turn on the guard mode and before driving the door handles of the vehicle to stretch out or get back, the method further comprising:

determining that door handle motors of the vehicle are not in a thermal protection state.

7. The method for controlling a vehicle door according to claim 1, wherein the determining that the touch signal of the second touch area is valid according to the vehicle state information comprises:

in response to determine that the vehicle door corresponding to the door handle is in a locked state and a guard mode off state according to the vehicle state information, determining that the touch signal of the second touch area is valid.

8. A vehicle, comprising a memory, a processor, and a vehicle door control program stored in the memory which, when executed by the processor, causes the processor to implement a method for controlling a vehicle door comprising:

in response to a touch signal of a first touch area being collected, acquiring vehicle state information and key position information;

in response to determine that the touch signal of the first touch area is valid and is a guard mode off request signal according to the vehicle state information and the key position information, controlling a vehicle to turn off a guard mode and driving door handles of the vehicle to stretch out; and after the door handles stretch out, in response to a touch signal of a second touch area corresponding to any door handle being collected, determining that the touch signal of the second touch area Is valid according to the vehicle state information, and controlling a vehicle door corresponding to the door handle to unlock.

9. A non-transitory computer storage medium, storing a vehicle door control program which, when executed by a processor, causes the processor to implement a method for controlling a vehicle door comprising:

in response to a touch signal of a first touch area being collected, acquiring vehicle state information and key position information;

in response to determine that the touch signal of the first touch area is valid and is a guard mode off request signal according to the vehicle state information and the key position information, controlling a vehicle to turn off a guard mode and driving door handles of the vehicle to stretch out; and after the door handles stretch out, in response to a touch signal of a second touch area corresponding to any door handle being collected, determining that the touch signal of the second touch area Is valid according to the vehicle state information, and controlling a vehicle door corresponding to the door handle to unlock.

10. The method for controlling a vehicle door according to claim 2, wherein the determining that the touch signal of the first touch area is valid and is a guard mode off request signal according to the vehicle state information and the key position information comprises:

in response to determine that the vehicle is in a guard mode on state and the vehicle is in an OFF gear state according to the vehicle state information and determining that a key is outside the vehicle according to the key position information, determining that the touch signal of the first touch area is valid and is the guard mode off request signal.

11. The method for controlling a vehicle door according to claim 2, after acquiring the vehicle state information and the key position information, the method further comprising:

in response to determine that the vehicle is in a guard mode off state and the vehicle doors are in an unlocked state according to the vehicle state information, determining that the touch signal of the first touch area is invalid; or in response to determine that the vehicle is in a guard mode off state, the vehicle doors are in a locked state and the vehicle is not in an OFF gear state according to the vehicle state information, determining that the touch signal of the first touch area is invalid; or in response to determine that the vehicle is in a guard mode off state, the vehicle doors are in a locked state and the vehicle is in an OFF gear state according to the vehicle state information and determining that the key is not outside the vehicle according to the key position information, determining that the touch signal of the first touch area is invalid; or in response to determine that the vehicle is in a guard mode on state and the vehicle is not in an OFF gear state according to the vehicle state information, determining that the touch signal of the first touch area is invalid; or in response to determine that the vehicle is in a guard mode on state and the vehicle is in an OFF gear state according to the vehicle state information and determining that the key is not outside the vehicle according to the key position information, determining that the touch signal of the first touch area is invalid.

12. The method for controlling a vehicle door according to claim 3, after acquiring the vehicle state information and the key position information, the method further comprising:

in response to determine that the vehicle is in a guard mode off state and the vehicle doors are in an unlocked state according to the vehicle state information, determining that the touch signal of the first touch area is invalid; or in response to determine that the vehicle is in a guard mode off state, the vehicle doors are in a locked state and the vehicle is not in an OFF gear state according to the vehicle state information, determining that the touch signal of the first touch area is invalid; or in response to determine that the vehicle is in a guard mode off state, the vehicle doors are in a locked state and the vehicle is in an OFF gear state according to the vehicle state information and determining that the key is not outside the vehicle according to the key position information, determining that the touch signal of the first touch area is invalid; or in response to determine that the vehicle is in a guard mode on state and the vehicle is not in an OFF gear state according to the vehicle state information, determining that the touch signal of the first touch area is invalid; or in response to determine that the vehicle is in a guard mode on state and the vehicle is in an OFF gear state according to the vehicle state information and determining that the key is not outside the vehicle according to the key position information, determining that the touch signal of the first touch area is invalid.

13. The method for controlling a vehicle door according to claim 4, after acquiring the vehicle state information and the key position information, the method further comprising:

in response to determine that the vehicle is in a guard mode off state and the vehicle doors are in an unlocked state according to the vehicle state information, determining that the touch signal of the first touch area is invalid; or in response to determine that the vehicle is in a guard mode off state, the vehicle doors are in a locked state and the vehicle is not in an OFF gear state according to the vehicle state information, determining that the touch signal of the first touch area is invalid; or in response to determine that the vehicle is in a guard mode off state, the vehicle doors are in a locked state and the vehicle is in an OFF gear state according to the vehicle state information and determining that the key is not outside the vehicle according to the key position information, determining that the touch signal of the first touch area is invalid; or in response to determine that the vehicle is in a guard mode on state and the vehicle is not in an OFF gear state according to the vehicle state information, determining that the touch signal of the first touch area is invalid; or in response to determine that the vehicle is in a guard mode on state and the vehicle is in an OFF gear state according to the vehicle state information and determining that the key is not outside the vehicle according to the key position information, determining that the touch signal of the first touch area is invalid.

* * * * *